No. 653,471. Patented July 10, 1900.
H. H. CUTLER.
CONTROLLER FOR DYNAMO ELECTRIC MACHINES.
(Application filed Aug. 24, 1899.)
(No Model.)
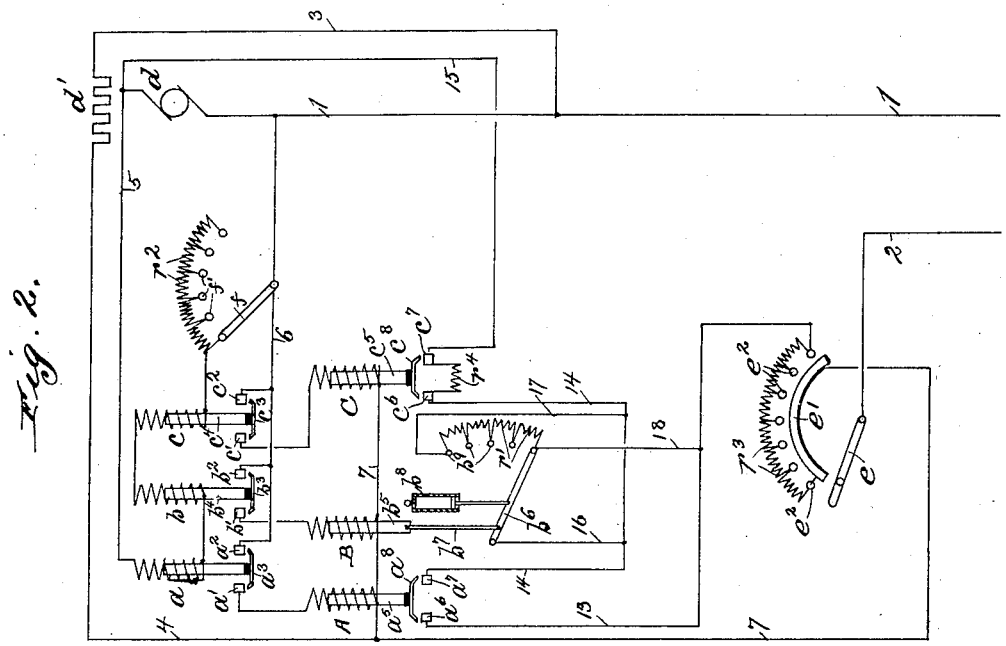
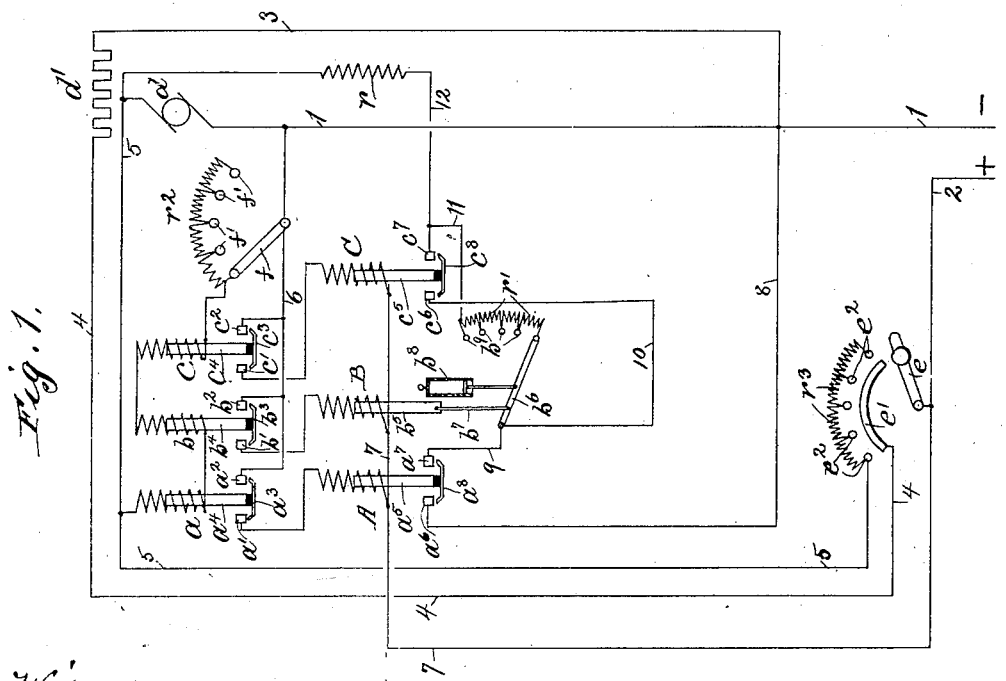
Witnesses:
Inventor:
Henry H. Cutler
By Ludington & Jones
Attorneys

UNITED STATES PATENT OFFICE.

HENRY H. CUTLER, OF CHICAGO, ILLINOIS.

CONTROLLER FOR DYNAMO-ELECTRIC MACHINES.

SPECIFICATION forming part of Letters Patent No. 653,471, dated July 10, 1900.

Application filed August 24, 1899. Serial No. 728,265. (No model.)

*To all whom it may concern:*

Be it known that I, HENRY H. CUTLER, a citizen of the United States, residing at Chicago, in the county of Cook and State of Illinois, have invented a certain new and useful Improvement in Controllers for Dynamo-Electric Machines, of which the following is a full, clear, concise, and exact description, reference being had to the accompanying drawings, forming a part of this specification.

My invention relates to a regulator for dynamo-electric machines, my object being to provide means whereby the voltage of a dynamo-electric machine may be regulated and controlled to maintain the same constant within prearranged limits.

In accordance with my invention I provide a plurality of solenoids adapted to be connected in parallel with the armature of the machine and to respond to different voltages of the armature, these solenoids serving when energized to control the voltage-varying means of the machine. I usually provide means for varying the voltage of the machine within prearranged limits, and in addition thereto I provide means for checking any rise of voltage above the prearranged limit and additional means for checking any fall of voltage below the prearranged limit.

In the present application, as illustrating the generic principle underlying my invention, I have shown and described the regulator as applied to an electric motor as distinguished from a generator, and I have inserted in the present application generic claims drawn, broadly, to contemplate a dynamo-electric machine generically, while in an application filed by me January 29, 1900, Serial No. 3,125, which application is a division of the present application, I have illustrated and described my invention as specifically adapted to a dynamo or generator. I have also inserted in the present application claims specifically drawn to the regulator as adapted to an electric motor.

For controlling the speed of a motor I arrange the regulating mechanism to control the resistance in a parallel path around the armature or to control the resistance in series with the armature of the motor, whereby the current through the armature may be varied to thereby regulate the voltage, and consequently the speed, of the motor. I provide a solenoid which is adapted to be energized at a prearranged voltage of the armature, and this solenoid serves to regulate the voltage within the prearranged limits. An additional solenoid is provided, which is actuated when the voltage rises above the upper limit to thereby suddenly check the rise of voltage, and a third solenoid is provided, which is energized when the voltage falls below the prearranged limit, thereby checking the fall of voltage. By the coöperation of these elements the voltage of the motor may be maintained inflexibly within prearranged limits, and the speed of the motor is thereby regulated and controlled. The regulating mechanism may be readily adjusted to fix the speed of the motor at any desired speed below full speed.

Throughout the specification and claims I have employed the term "solenoid" with its broad significance as comprehending both electromagnets having a fixed core and a movable armature, and "solenoids," strictly so called, having a movable core.

I have illustrated my invention in the accompanying drawings, in which—

Figure 1 is a diagram illustrating one form of my invention as applied to an electric motor. Fig. 2 is a diagram illustrating another form of my invention as applied to an electric motor.

Like characters refer to like parts in both figures.

A plurality of solenoids $a\, b\, c$ are connected in series across the armature $d$ of the electric motor. The solenoids are wound so that solenoid $a$ will be energized at a lower voltage than solenoid $b$ and so that solenoid $b$ will be energized at a lower voltage than solenoid $c$. For the purpose of description I shall assume that the motor has a voltage of one hundred and ten volts and that it is desired to maintain the speed of the motor constant at one-tenth the normal speed. In this case the solenoid $a$ will be adjusted to be energized when the voltage of the armature has been built up to ten volts, the solenoid $b$ will be energized when the voltage of the armature is one-tenth the normal voltage, and solenoid $c$ will respond to a voltage of twelve volts. For adjusting to a higher voltage a rheostat $r^2$ is provided, the coils of which are connected with terminals $f'$, over which a contact-arm $f$ is adapted to be moved, whereby the circuit around the armature, including the solenoids $a\ b\ c$, may be increased in resistance to the required degree to thereby increase the voltage at which the solenoids will be energized. The core $a^4$ of solenoid $a$ carries a contact-plate $a^3$, which when raised is adapted to engage contacts $a'\ a^2$. Likewise core $b^4$ of solenoid $b$ carries contact-plate $b^3$, adapted when raised to engage contacts $b'\ b^2$, and in a like manner core $c^4$ of solenoid $c$ carries a contact-plate $c^3$, which when raised engages contacts $c'\ c^2$. The contacts $a^2\ b^2\ c^2$ are connected with a conductor 6, which extends to the main 1 of the supply-circuit which extends to one brush of the armature $d$. The contact $a'$ extends to one end of a solenoid A, the other end of which solenoid is connected by conductor 7 with the opposite main 2 of the supply-circuit. The contact $b'$ is connected with one end of solenoid B, the other end being connected with conductor 7. Contact $c'$ is connected with one end of solenoid C, and the other end of said solenoid is connected with conductor 7.

The core $a^5$ of solenoid A carries a contact-plate $a^8$, adapted when raised to engage contacts $a^6\ a^7$. The core $b^5$ of solenoid B is connected with a pivoted contact-arm $b^6$ by means of link $b^7$, and the contact-arm $b^6$ is adapted to be moved over a series of terminals $b^9$, between which are connected the coils of a resistance $r'$. A dash-pot $b^8$ is connected with contact-arm $b^6$ to retard and regulate the movement of said contact-arm. The core $c^5$ of solenoid C carries a contact-plate $c^8$, adapted when raised to engage contacts $c^6\ c^7$. Contact $a^6$ is connected by conductor 8 with main 1, and contact $a^7$ is connected by conductor 9 with the contact-arm $b^6$. Contact $c^6$ is connected by conductor 10 with contact-arm $b^6$, and contact $c^7$ is connected by conductor 11 with the end of resistance $r'$. Contact $c^7$ is also connected, by means of conductor 12, with a resistance $r$.

The field $d'$ of the motor is connected by means of conductor 3 with main 1 and by means of conductor 4 with contact-plate $e'$, adapted to be engaged by the arm $e$ of the starting-switch, said arm $e$ being connected with main 2 and being adapted to be moved over a series of terminals $e^2$, between which are connected the coils of a resistance $r^3$. The end of resistance $r^3$ is connected by means of conductor 5 to one brush of the armature $d$.

The operation of the apparatus in maintaining the speed of the motor constant is as follows: Supposing the motor to be at rest and it is desired to start the same, the contact-arm $e$ will be moved over the terminals $e^2$ of the starting-resistance $r^3$, and current will thus be closed from main 2 through conductor 5, through the armature $d$, to the return-main 1, and current through the shunt-field will pass over conductor 4, through the field $d'$, and by conductor 3 to the return-main 1. The motor will thus be traversed with current, and the armature will build up in speed, and the voltage thereof will gradually increase as the speed increases. It has been assumed for the purpose of description that it is desired to operate the motor at a speed of one-tenth the normal, in which case the solenoids $a\ b\ c$ will be adjusted to respond to voltages of ten, eleven, and twelve volts, respectively, so that these solenoids will be energized when the voltage across the armature rises to these respective values. When the voltage across the armature rises to ten volts, sufficient current will traverse the solenoid $a$ to energize the same and the core thereof will be attracted, thereby moving plate $a^3$ into contact with contacts $a'$ and $a^2$. Circuit will thus be closed to solenoid A, as follows: From main 2 over conductor 7, solenoid A, contacts $a'\ a^3\ a^2$, conductor 6 to main 1. The core of solenoid A will thereby be attracted and move the contact-plate $a^8$ into engagement with contacts $a^6\ a^7$, thereby closing a short circuit around the armature, including resistances $r'$ and $r$. This circuit being traced from main 1 over conductor 8, contacts $a^6\ a^8\ a^7$, conductor 9, contact-arm $b^6$, resistance $r'$, conductors 11 and 12, through resistance $r$ to conductor 5, and thence to the opposite side to the opposite main 2. A parallel path around the armature, including the resistances $r$ and $r'$, is thus closed and the armature will be robbed of a portion of its current, thereby tending to decrease the speed of the motor. If the current thus shunted around the armature is not sufficient to at once check the increase of speed, the voltage of the armature will rise to eleven volts and energize solenoid $b$, which will attract its core and close circuit through solenoid B, and the latter solenoid will attract its core, thereby moving contact-arm $b^6$ over terminals $b^9$ and gradually removing the resistance $r'$ from circuit. As the resistance $r'$ is decreased a greater amount of current is permitted to flow through the shunt around the armature, thereby further decreasing the current supplied to the armature and tending to check the speed thereof. If the voltage continues to rise and reaches twelve volts, solenoid $c$ will be energized, thereby attracting its core and closing circuit through solenoid C, which moves contact-plate $c^8$ into contact with contacts $c^6\ c^7$, thereby short-circuiting resistance $r'$ or the portion thereof which has been included in circuit by contact-arm $b^6$. This removal of resistance $r'$ wholly from circuit is sufficient to rob the armature of sufficient current to at once decrease its speed, and when the voltage falls below twelve volts the solenoid C will be deënergized and the solenoid B will control the speed by varying the resistance $r'$. During the normal operation the solenoid B will regulate the speed by varying the resistance $r'$, and if at any time, due to a sudden load being thrown on the motor, the speed is decreased materially so that the voltage falls below ten volts solenoid A is deënergized, thereby opening the shunt around the armature entirely and permitting the armature to build up in speed. On the other hand, if at any time the speed of the armature increases materially above the normal, as when a portion of the load is suddenly thrown off, the rise of voltage, due to the increased speed, will cause the solenoid C to be energized, thereby removing resistance $r'$ entirely and at once checking the increase of speed. During the normal operation thereof the solenoid B serves to regulate the speed of the motor within prearranged limits, while the solenoids A and C act respectively to check any abnormal decrease or increase of the speed.

The system as above described is applicable to motors when it is desired to operate the same at any speed below the normal, but not to exceed one-half of the normal speed. When it is desired to run the motor at speeds greater than one-half of the normal, it is not usually necessary to use a governor except in cases where the load or the voltage is exceedingly variable over large limits. In such cases, for economy, it is best to arrange the governor to vary the amount of resistance in series with the armature instead of connecting the resistance in a shunt around the armature, as described in connection with Fig. 1.

In Fig. 2 I have illustrated my invention as applicable to the regulation of a motor by means of the variation of the resistance in series with the armature of the motor. Solenoids $a\ b\ c$ are connected in circuit, as before described, and solenoids A B C are connected in parallel with the armature, as before described. The contact-plate $a^8$ of solenoid A is, however, arranged above the contacts $a^6$ $a^7$, and likewise the contact-plate $c^8$ of solenoid C is arranged above the contacts $c^6$ $c^7$. The contact-plates normally rest against the contacts and are separated therefrom when the respective solenoids are energized. The solenoid B is arranged, as before, to vary the resistance $r'$. I have illustrated a slightly-modified form of hand-switch in which the arm $e$ is connected with the main 2, while contact-plate $e'$ is connected by a conductor 7 with the ends of the solenoids A B C and with conductor 4, which extends to the shunt-field. The contact $a^6$ is connected by a conductor 13 with the end of the starting-resistance $r^3$, and the contact $a^7$ is connected by conductor 14 with contact $c^6$. The contact $c^7$ is connected by conductor 15 with one side of the armature, and a resistance $r^4$ is connected between the contacts $c^6$ and $c^7$. A conductor 16 extends from the contact-arm $b^6$ to conductor 14, and a conductor 17 connects the end of resistance $r'$ with conductor 14. The opposite end of resistance $r'$ is connected by conductor 18 with the end of starting-resistance $r^3$.

The operation of the system is as follows: Assuming that the motor is to run at one-half the normal speed, in which case the solenoids $a\ b\ c$ will be adjusted to respond to fifty-four, fifty-five, and fifty-six volts, respectively, by moving the contact-arm $e$ over the terminals $e^2$ of resistance $r^3$ circuit is closed from main 2 through the starting-resistance, conductor 13, contacts $a^6$ $a^8$ $a^7$, conductor 14, contacts $c^6$ $c^8$ $c^7$, conductor 15, armature $d$ to the opposite main 1. The shunt-current flows over conductors 7 and 4, through the shunt-field $d'$, and thence by conductor 3 to main 1. When the voltage of the armature rises to fifty-four volts, solenoid $a$ is energized, thereby energizing solenoid A, which attracts its core and raises plate $a^8$ out of engagement with contacts $a^6$ $a^7$, thereby opening the short circuit around resistance $r'$. This energizing of solenoid A does not vary the action of the motor in starting, but is effective in regulating the speed during the operation, as will be hereinafter described. The current now passes from the starting resistance over conductor 18, contact-arm $b^6$, conductor 16 to conductor 14, and thence by the route last traced. When the voltage rises to fifty-five volts, solenoid $b$ is energized, thereby energizing solenoid B, which attracts its core and moves contact-arm $b^6$ over terminals $b^9$ of resistance $r'$, thereby gradually inserting resistance $r'$ in circuit to decrease the current supplied to the motor. If the speed continues to increase and reaches fifty-six volts, solenoid $c$ is energized, thereby energizing solenoid C and moving contact-plate $c^8$ out of contact with contacts $c^6$ $c^7$ to remove the short circuit about resistance $r^4$, thereby including the same in circuit and materially decreasing the current supplied to the motor and at once checking the increase of speed. When the voltage falls below fifty-six volts, the solenoid C is deënergized and resistance $r^4$ is cut from circuit. During the normal operation of the motor the voltage varies between fifty-four and fifty-six volts, and solenoid B is thus alternately energized and deënergized to vary the resistance $r'$ in proper degree. Any sudden decrease of voltage below fifty-four volts deënergizes solenoid A, thereby short-circuiting resistance $r'$ entirely and permitting a sudden increase of the current through the motor, which checks the decrease of speed. Any sudden increase of voltage, on the other hand, above fifty-six volts energizes solenoid C, thereby inserting resistance $r^4$ in circuit with the armature and cutting down the current to at once check the increase of the speed. Solenoid B by being alternately energized and deënergized to vary resistance $r'$ maintains the speed of the motor constant within prearranged limits—that is, within a limit of one volt above and below the normal—while solenoids A and C serve to check any decrease or increase of the speed beyond these limits.

Having described my invention, what I claim as new, and desire to secure by Letters Patent, is—

1. The combination with a dynamo-electric machine, of means for regulating the voltage thereof within prearranged limits and auxiliary means for checking the rise or fall of voltage beyond said prearranged limits, substantially as described.

2. The combination with a dynamo-electric machine, of a solenoid for regulating the voltage thereof within prearranged limits and auxiliary solenoids for checking the rise or fall of the voltage beyond said limits, substantially as described.

3. The combination with a dynamo-electric machine, of a solenoid for regulating the voltage thereof within prearranged limits, a solenoid for checking the rise of voltage above said limits, and a solenoid for checking the fall of voltage below said limit, substantially as described.

4. The combination with a dynamo-electric machine, of a solenoid for regulating the voltage thereof within prearranged limits, a solenoid for checking the rise of voltage above said limit, a solenoid for checking the fall of voltage below said limit, and solenoids for controlling the respective solenoids above mentioned and arranged to be actuated at different voltages, substantially as described.

5. The combination with a dynamo-electric machine, of a solenoid for regulating the voltage thereof within prearranged limits, a second solenoid for checking the rise of voltage above said limit, a third solenoid for checking the fall of voltage below said limit, a solenoid for controlling said first solenoid above mentioned and arranged to be energized at a prearranged voltage, a solenoid for controlling said second solenoid above mentioned and arranged to respond to a higher voltage, and a solenoid for controlling said third solenoid above mentioned and arranged to respond to a lower voltage, substantially as described.

6. The combination with a motor and a supply-circuit for supplying current thereto, of means for regulating the voltage of the motor within prearranged limits, and auxiliary means for checking the rise or fall of the voltage beyond said prearranged limits, substantially as described.

7. The combination with an electric motor and a supply-circuit for supplying current thereto, of a solenoid for regulating the voltage of said motor within prearranged limits, and auxiliary solenoids for checking the rise or fall of said voltage beyond said prearranged limits, substantially as described.

8. The combination with an electric motor, of means for regulating the speed thereof within prearranged limits, and auxiliary means for checking the rise or fall of the speed beyond said prearranged limits, substantially as described.

9. The combination with an electric motor, of means for regulating the current supplied to the armature thereof within prearranged limits, and auxiliary means for checking the rise or fall of the voltage beyond said prearranged limits, substantially as described.

10. The combination with an electric motor, of a resistance associated with the armature thereof, means for varying the said resistance to regulate the voltage of the motor within prearranged limits, and auxiliary means for checking the rise and fall of said voltage beyond said prearranged limits, substantially as described.

11. The combination with an electric motor, of a resistance associated with the armature thereof, means for varying said resistance to regulate the voltage of the motor within prearranged limits, means for materially and abruptly increasing the resistance to prevent the voltage from passing the prearranged limit in one direction, and means for materially and abruptly decreasing the resistance to prevent the voltage from passing the prearranged limit in the other direction, substantially as described.

12. The combination with an electric motor, of means for regulating the voltage thereof within prearranged limits, means for checking the rise of voltage beyond said prearranged limits, means for checking the fall of voltage beyond said prearranged limits, and solenoids for controlling said respective means and arranged to be operated at different voltages, substantially as described.

13. The combination with an electric motor, of means for regulating the voltage thereof within prearranged limits, means for checking the rise of voltage beyond said prearranged limits, means for checking the fall of voltage beyond said prearranged limits, and solenoids for controlling said respective means, connected in parallel with the armature of said motor and arranged to operate at different voltages, substantially as described.

14. The combination with an electric motor, of means for regulating the voltage thereof within prearranged limits, means for checking the rise of voltage beyond said limits, means for checking the fall of voltage beyond said limits, solenoids for controlling said respective means and connected in series in a branch circuit in parallel with the armature and arranged to be operated at different voltages, substantially as described.

15. The combination with an electrical circuit, of means for regulating the electrical condition of the same within prearranged limits, and auxiliary means for checking the variation of the circuit conditions in either direction beyond said prearranged limits, substantially as described.

16. The combination with an electrical circuit, of a regulator for controlling the electrical condition thereof within prearranged limits, circuit-controlling devices for checking the variation in either direction beyond said prearranged limits, an electromagnet responding to a definite current for controlling said regulator, and electromagnets responding respectively to currents above and below the actuating-current of said first-mentioned electromagnet for controlling said circuit-controlling devices, substantially as described.

In witness whereof I have hereunto subscribed my name in the presence of two witnesses.

HENRY H. CUTLER.

Witnesses:
W. CLYDE JONES,
M. R. ROCHFORD.